United States Patent [19]

Hatchett et al.

[11] Patent Number: 4,809,102
[45] Date of Patent: Feb. 28, 1989

[54] DISK FILE WITH AIR FILTRATION SYSTEM

[75] Inventors: Michael R. Hatchett, Chandlers Ford; John S. Heath, Winchester, both of United Kingdom

[73] Assignee: International Business Machines Corporation, Armonk, N.Y.

[21] Appl. No.: 43,508

[22] Filed: Apr. 28, 1987

[30] Foreign Application Priority Data

May 8, 1986 [EP] European Pat. Off. ........ 86303515.0

[51] Int. Cl.[4] ............................................. G11B 5/012
[52] U.S. Cl. ...................................................... 360/98
[58] Field of Search .................................... 380/97-99, 380/133

[56] References Cited

U.S. PATENT DOCUMENTS 4,329,722  5/1982  West ...................... 360/98
4,412,261 10/1983  Tateyama et al. ....... 360/98
4,488,193 12/1984  Davis et al. ............. 360/98
4,599,664  7/1986  Schuh .................... 360/97
4,633,349 12/1986  Beck et al. ............. 360/98

FOREIGN PATENT DOCUMENTS 2905413  4/1980  Fed. Rep. of Germany.
0094281  5/1984  Japan .................... 360/133

Primary Examiner—Stuart N. Hecker
Assistant Examiner—David J. Severin
Attorney, Agent, or Firm—Robert W. Lahtinen

[57] ABSTRACT

A disk file of the kind employing a vented hub assembly and slotted spacers between disks to provide a passage for circulatory airflow employs a filter assembly extending circumferentially around the axial region of the hub assembly. The primary path for airflow is from a high pressure region at the periphery of the disks, through the filter assembly into the vented hub assembly and out again via the slotted spacers. A parallel leakage path between the filter itself and the hub assembly is limited by making the separation between a substantially planar surface of the filter assembly and the adjacent disk uniform and very small. Airflow rates through the filter are consequently enhanced.

12 Claims, 4 Drawing Sheets

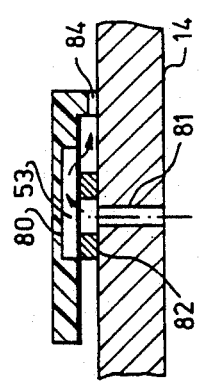
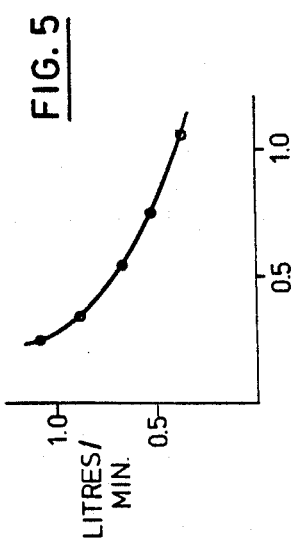
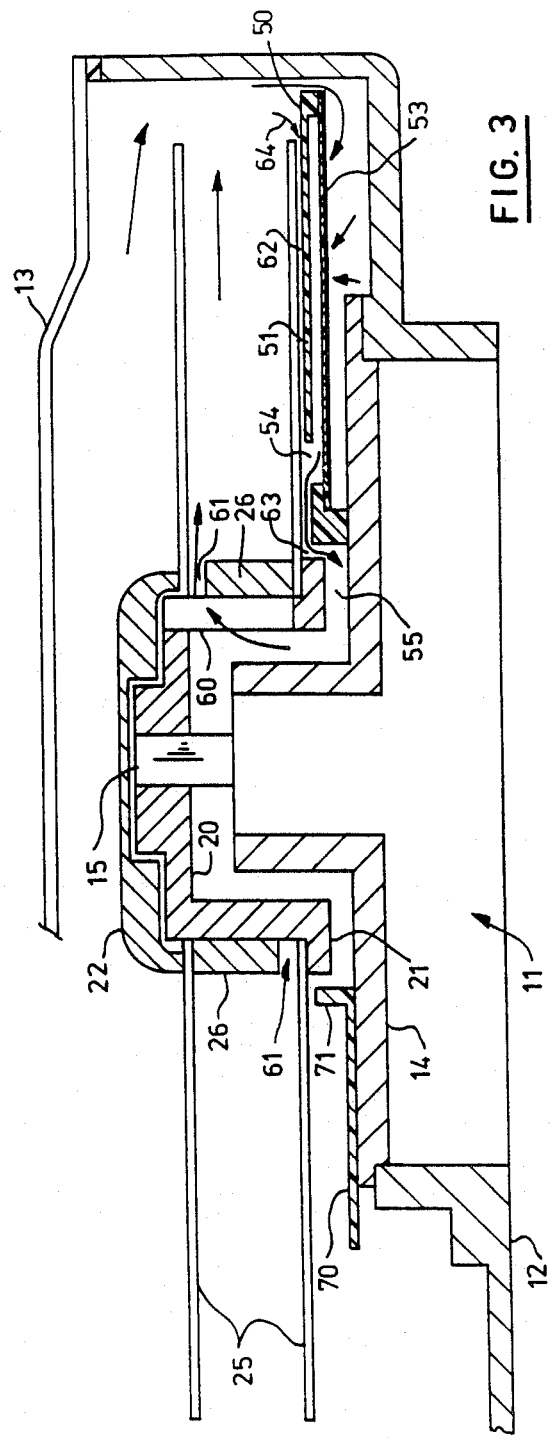

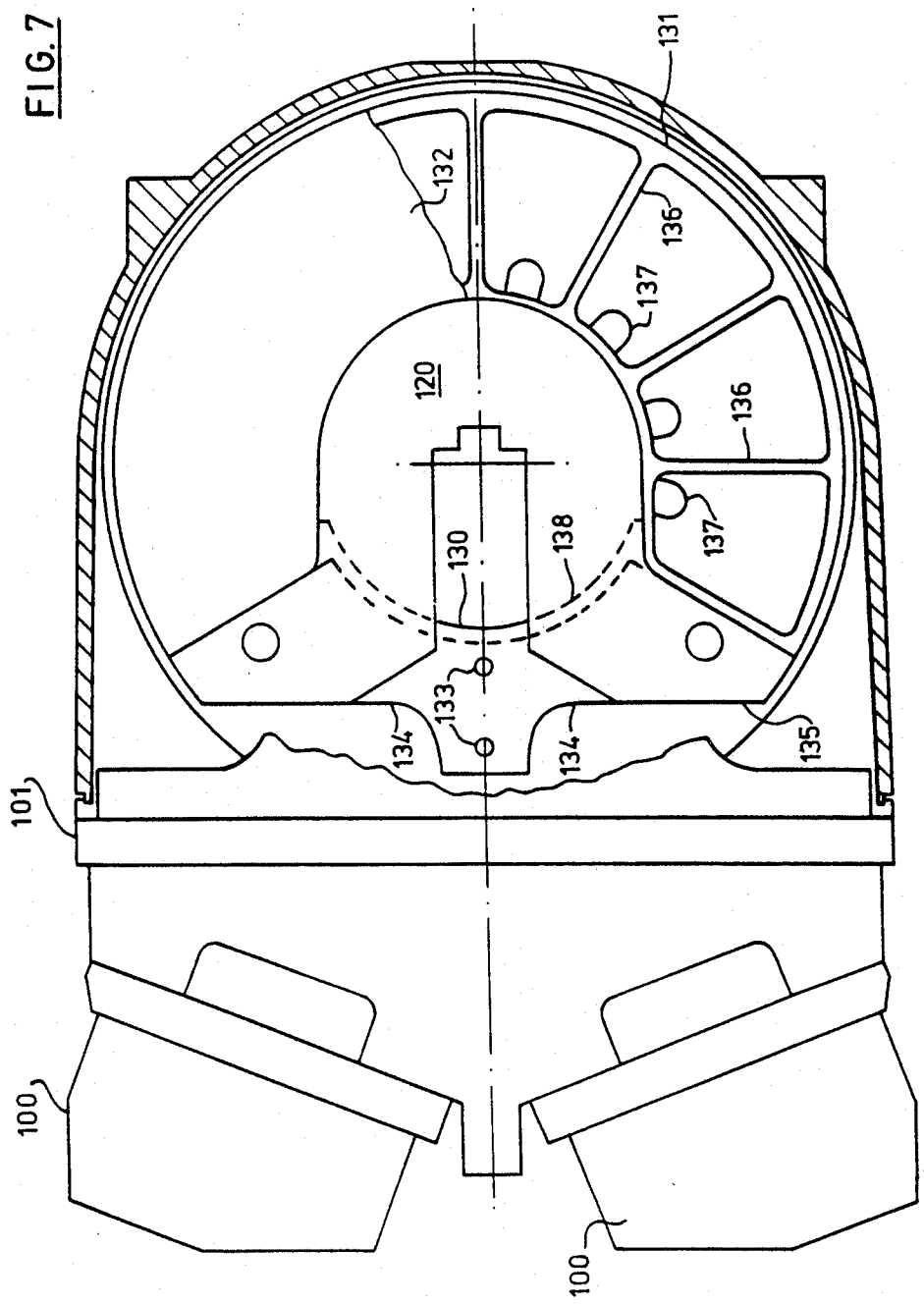

DISK FILE WITH AIR FILTRATION SYSTEM

TECHNICAL FIELD OF THE INVENTION

The present invention relates to disk files for information storage and particularly to the air filtration systems of such files.

BACKGROUND ART

At the very small separations currently employed between the transducing heads and disks of a disk file, which may be of the order of $0.5 \times 10^{-6}$ m, it is essential to enclose at least the head/disk assembly (HDA) completely and to provide within the enclosure a filter for filtering particulate and other contamination. Failure to remove particles of sizes comparable to the head/disk separation can lead to head crashes and damage to the recording medium.

Some typical filtration systems for earlier magnetic disk files are described in U.S. Pat. Nos. 3,489,800; 3,710,357; and 4,054,931. In the systems shown in these patents, fan blades, assisted to some extent by the rotation of the disks, were employed to produce a pressure differential to circulate air through a filter within the enclosure.

A more recent development in the design of disk file filtration systems has been the concept of the internally vented hub. By venting the hub assembly on which a stack of disks is mounted and slotting the spacers between the disks, the pressure differential created between the low pressure hub region and the high pressure region at the outer periphery of the disks is maximised causing a circulatory airflow around and between the disks. The filter must be located within this circulatory airflow. In such systems, scavenging of particles from between the disks is particularly effective and the pressure differentials obtainable are such that additional fan blades are usually not needed.

One example of this latter type of system is shown in U.S. Pat. No. 4,633,349. The disk file described in this application has a stack of disks separated by slotted spacers and mounted on a bell-shaped hub assembly. The disk stack rests on an outer flange of the hub assembly which includes a deeply dished spring clamp to hold the stack in place. This clamp has openings in it to permit communication between the inter-disk spaces and an axial region at one end of the hub assembly. The filter employed is a cartridge in the form of an annular plenum encircling the top of the hub assembly above the extreme disk of the stack. Air enters the filter through peripheral openings in the plenum. Within the plenum is a double layer of filter paper, the lower layer being annular and sealed around a central outlet hole located above and around the vented hub assembly. Air entering the plenum can only exit after passing through one or both of the filter papers from where it is drawn into the low pressure region of the hub assembly. However, the clearance gap between the filter outlet and the hub assembly constitutes a leakage path by which air can bypass the filer assembly.

In the prior art, as has been mentioned above, the pumping action causing the pressure differential to drive air through a filter is produced by rotation of a stack of disks, sometimes assisted by fan blades. A disk file having only a single disk yet no fan is shown in U.S. Pat. No. 4,268,878. To achieve an adequate pumping action, a stationary 'control plate' is positioned over and close to the single disk. The plate has an annular gap around the disk hub. Rotation of the disk causes an outward pumping action in the region between the control plate and the disk. This draws air through the annular gap from an upper chamber above the control plate and pumps it outwardly. A return path to the upper chamber is provided via a filter in one corner of the enclosure.

DISCLOSURE OF THE INVENTION

As discussed above, the vented hub and slotted spacer techniques employed in a disk file having multiple disks enable efficient circulation of air around the critical areas of an enclosed HDA and through a filter without the use of a fan. However, as disk files decrease in physical size, the pressure differentials achievable decrease with disk diameter leading in some cases to inadequate airflow through the filter. Also with decreasing enclosure volume, the space available for the filter and thus the cross-sectional area of filter medium presented to the airflow becomes limited. A filter adjacent and roughly co-extensive with the outer surface of an extreme disk is probably the most attractive choice in terms of space and filter area. However, prior art systems have not maximised the flow of air through such filters by minimising or preventing leakage of air to the hub assembly thus by-passing the filter.

Accordingly, the present invention provides a disk file comprising a disk enclosure; a disk stack within the enclosure comprising a plurality of annular information storage disks, adjacent disks of which are separated by a radially vented spacer; a plurality of transducing heads co-operable with the disks for writing information on and/or reading information from the disks; a rotatable hub assembly for supporting the disk stack for rotation therewith, the hub assembly including vents by way of which and said vented spacer an axial region of the enclosure adjacent an extreme disk of the stack communicates with the space between adjacent disks whereby, in operation, the pumping action of the disks creates a high pressure region at the periphery of the disk stack and a low pressure region adjacent the hub assembly to cause a circulatory airflow around and between the disks via said hub assembly vents and the vented spacer; and a filter assembly fixedly mounted in said axial region and extending circumferentially around the hub assembly, the arrangement of the filter assembly being such that communication between the axial region of the enclosure and the hub assembly vents is substantially via the filter assembly except for a clearance gap between the filter assembly and hub assembly to permit free rotation of the latter, characterised in that:—the filter assembly has a major planar surface closest to the surface of the extreme disk and at a uniform separation therefrom, the separation between the planar surface of the filter assembly and the extreme disk surface being smaller than the separation between the disks by an amount sufficient at least to reduce inward leakage of air through the clearance gap and to increase airflow through the filter assembly.

It will be clear that the invention is not necessarily restricted to magnetic disk files having flying heads but could also be applicable in other types of disk file employing optical or electrostatic recording, for example.

Preferably, the separation is sufficiently small that the filter assembly and extreme disk form a centrifugal viscous pump opposing the pressure differential between the high and low pressure regions. Ideally, this compensating pumping action would create a pressure differential just sufficient to stop inward airflow through the clearance gap but theoretical considerations indicate that, although the inward airflow is reduced, it cannot be stopped or reversed. Even so, a surprising improvement in the airflow through the filter assembly results.

A centrifugal viscous pump is one in which a rotating member entrains a fluid by means of viscosity alone and throws it outwardly. To operate as a pump, a co-rotating or, in this case, fixed member must confine a layer of fluid near to the surface of the rotating member so that substantially all the fluid in the layer is in motion.

The preferred range of separations has been found to be less than 1.1 mm, with the airflow through the filter being inversely related to the separation. The preferred separation range is 0.35 to 0.6 mm. Smaller separations than these can be contemplated but it would be difficult to maintain tolerances in quantity production.

Although, ideally, the filter assembly and medium should extend right around the hub assembly for maximum effectiveness, this is not compatible with access of a transducing head to the outer surface of the extreme disk adjacent the filter. It is thus a preferred feature of the invention that the filter assembly comprises an arcuate portion extending around a major portion only of the hub assembly circumference at the uniform separation from the extreme disk. The ends of the arcuate portion define a gap around a minor portion of the hub assembly circumference sufficiently deep relative to said uniform separation to accommodate at least one of the transducing heads for co-operation with the outer surface of the extreme disk.

Another advantage of limiting the circumferential extent of the closely spaced portion of the filter assembly in this way to accommodate one or more heads, is that the axial height of the file can be further reduced. To reduce excessive leakage of air via such a gap to the hub assembly it is further preferred that the file includes a barrier extending circumferentially across the gap inward of the transducing head position.

Such a barrier is preferably formed as a lip on the filter assembly which extends towards the extreme disk. Clearly, other forms of barrier are possible and need not necessarily constitute part of the filter assembly at all.

It is preferred that the filter assembly is not only arcuate but is in the form of an annular shallow trough and includes a laminar filter medium of corresponding shape covering the trough. The trough is apertured at its inner diameter to communicate with the low pressure region adjacent the hub assembly.

An annular shape enables the filter to be substantially co-extensive with the disk surface and thereby maximise the viscous pumping action. The aperturing of the trough at its inner diameter ensures that the pressure differential across the filter is maximised in that this is the portion of the filter closest to the low pressure region around the hub assembly.

Where the disk file is of the type comprising a drive motor having a mounting plate in which a spindle is supported for rotation with the hub assembly being mounted on one end of the spindle, it is preferred that the filter assembly is mounted on the motor mounting plate adjacent the extreme disk of the stack. As an alternative, where the enclosure comprises a base casting, the filter assembly can be mounted on the base casting.

In both cases, the important feature is that a rigid mounting of the filter assembly is needed to maintain the relatively fine tolerance on the small separation between the filter assembly and the extreme disk of the stack.

In cases where the hub assembly is mounted on one end of a motor drive spindle, it is preferred that the hub assembly includes a flanged bell portion supporting the disk stack and that the hub assembly vents are slots through the bell portion communicating with the radial slots in the spacers of the disk stack.

In an alternative construction of disk file in which the hub assembly includes an internal drive motor with an external cylindrical rotor casing, flanged to support the disk stack, it is preferred that the hub assembly vents include cross grooves and flutes in the outer surface of the rotor casing which communicate with the radial slots in the spacers of the disk stack.

BRIEF DESCRIPTION OF THE DRAWINGS

The invention will now be described, by way of example only, with reference to the accompanying drawings in which:

FIG. 3 is an enlarged and simplified cross section through a portion of the disk file of FIG. 1 including the filter assembly;

FIG. 4 is a cross sectional detail of a breather filter portion of the filter assembly;

FIG. 5 is a graph showing the relationship between airflow through the filter assembly and the separation of the filter assembly and disk stack;

FIG. 7 is a partly broken away and sectioned plan view of the disk file of FIG. 6 to reveal a filter assembly employed therein.

DETAILED DESCRIPTION OF THE INVENTION

Figure 2:
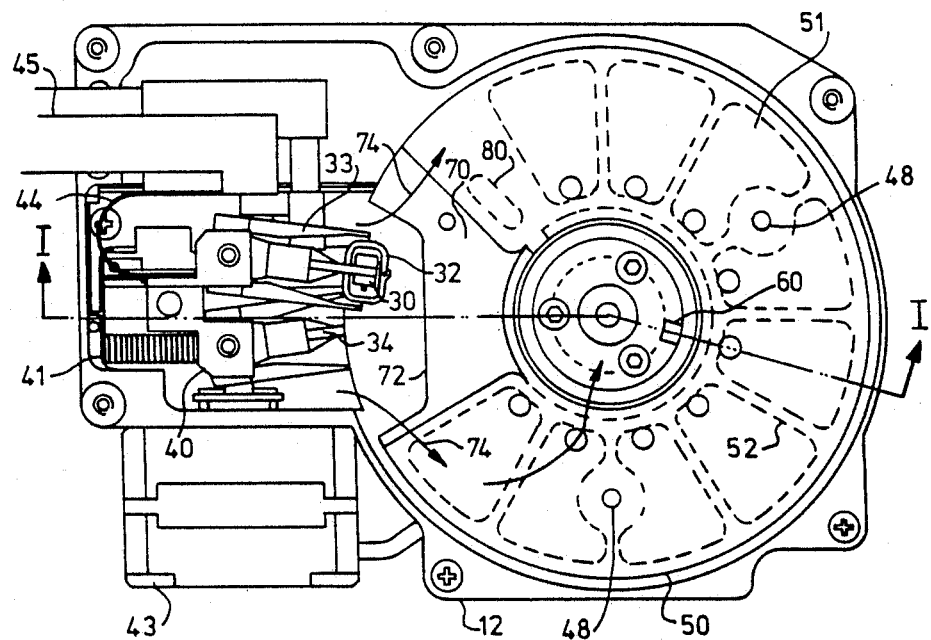
FIG. 2 is a plan view of the disk file of FIG. 1 with the disk stack and clamp removed to reveal the filter assembly.
Figure 1:
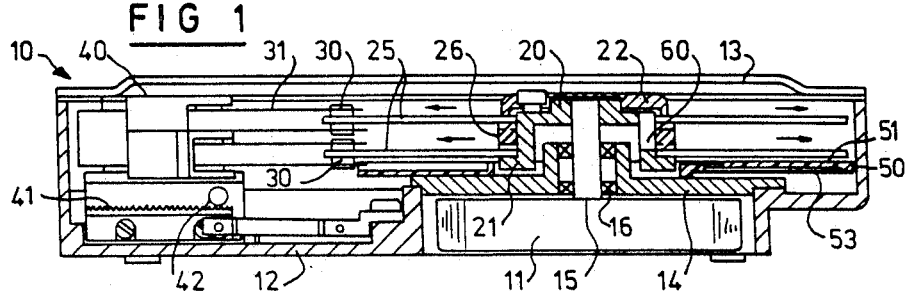
FIG. 1 is a cross section through a disk file according to the present invention taken on the line II—II of FIG. 2.

The disk file shown in FIGS. 1 to 3 is a compact magnetic disk file consisting of an enclosed head/disk assembly 10 and an integral drive motor 11 external to the enclosure. The enclosure is formed by a base casting 12, cover 13 and a mounting plate 14 for motor 11.

A spindle 15 protrudes from the motor and is supported for rotation by bearings 16 seated in a housing formed in the mounting plate. Pressed onto the outer end of the spindle for rotation therewith is a hub assembly consisting of a bell-shaped hub 20 having a flange 21 and a sprung disk clamp 22. The flange 21 supports two disks 25 separated by a spacer 26 which are clamped tightly together and onto the hub by the clamp 22.

The disk stack is rotated by the motor 11 to carry the disks 25 past four electromagnetic transducing heads 30. These heads write information on and read information from respective associated disk surfaces. The heads 30 are conventionally supported adjacent the disks by head support arms 31 (illustrated only schematically in FIG. 1) each including a gimbal mount 32 and leaf spring flexure 33. The heads are urged towards their respective disk surfaces by load arm 34 and fly over and very close to the disk surfaces during rotation of the disk stack. When the disks are at rest, the heads 30 land on the disk surfaces To access different tracks on the disks the head/arm assemblies are mounted on the carriage 40 of an access mechanism which can move them approximately radially over the surfaces of the disks. The access mechanism is of the rack and pinion type in which a moving rack 41 is driven by the output pinion 42 of a stepper motor 43. The stepper motor is pivotally mounted and is spring biased to maintain engagement of the pinion with the rack. The carriage 40 moves linearly with the rack on a guide rod (not visible). A flexible cable 44 connects the moving head/arm assembly to a tape cable 45.

In order to provide filtration of the air within the enclosure, a filter assembly 50 is provided. As shown particularly in FIGS. 2 and 3, the filter assembly is moulded in the form of an annulus. It is bolted at three points 48 onto the mounting plate 14 of motor 11 immediately beneath the lower disk 25 of the stack.

The filter assembly moulding surrounds the hub assembly 20 completely but an active filter portion 51 extends only over about 270° of the annulus. Although the filter assembly portion 51 is sealed firmly against the mounting plate 14 by a rim 49 formed at its inner diameter, its lower surface is kept clear of the mounting plate by moulded stand-off features beneath bolting points 48. This active portion 51 is in the form of an inverted shallow trough which is ribbed as at 52, to divide it into several compartments. A three-quarters annular filter paper 53 is glued down to the ribs 52 and to the rim of the trough 51 to cover the trough completely.

Each compartment of the trough 51 includes an aperture 54 communicating between the volume enclosed by the trough and filter paper and a space 55 beneath the flange 21 of the hub assembly. This space 55 leads to the interior of hub 20. The hub 20 is provided with window passages 60 (only one of which is shown) which communicate in turn with castellation slots 61 in spacers 26.

In operation, rotation of the disks pumps air outwardly to the periphery of the enclosure creating a high pressure region at the periphery and a low pressure region within the hub assembly. As a result, air circulates from the hub assembly through windows 60 and spacer slots 61 to the periphery of the disks 25 and returns beneath the disks through the filter assembly 50 and passage 55 to the interior of the hub. This general circulation of air is illustrated by arrows in FIG. 3.

To prevent leakage of air past the filter assembly 50 by way of the gap 62 between the filter assembly and the underside of the lower disk 25 and of the clearance gap 63 between the fixed filter assembly and rotating hub assembly 20, which is necessary to allow free rotation, the gap 62 is made very small. This has the effect of creating a centrifugal viscous pump between the lower disk surface and the filter assembly which tends to oppose inflow of air through gap 62 in the direction indicated by the small arrow 64 in FIG. 3.

Although, ideally, this inflow should be stopped or reversed, theoretical considerations indicate that an outward pressure differential along gap 62 equal to or greater than the overall inward pressure differential between enclosure periphery and hub cannot be produced. Nevertheless, leakage is reduced and, more importantly, a significant improvement in the rate of airflow through the filter is achieved. The variation of filter airflow rate with separation of filter and lower disk is shown in FIG. 5. As can be seen, filter airflow rate increases noticeably with decreased separation below about 1.1 mm. Measurements were taken over a range of 0.25 to 1.1 mm.

Moulding tolerances on the filter assembly and rigid support of the assembly on the motor mounting plate 14 allow a separation of 0.35 mm to be reliably achieved. In the small file illustrated, the corresponding flow rate of about 1 litre/minute is equivalent to about 6 air changes per minute.

Another aspect of the design of the filter assembly 50 is the provision of relieved sector 70 in a minor portion of the annular filter assembly 50. In this sector 70 there is no filter medium. The purpose of the relief gap is to accommodate the read/write heads 30 as they move to their innermost position over the outer surface of the lower disk 25. The filter medium is not made to bridge the sector 70 at an increase separation in order to allow the axial height of the file to be minimised. To prevent the creation of a large leakage path in the region 70, in parallel with that through the filter, a barrier 71 is provided in the form of an upturned lip on the filter assembly.

In fact, as shown in FIG. 2, air from the neighbourhood of the access mechanism can still reach the filter by passing beneath the lip 72 of the relieved sector 70 as shown by the arrows 74. Such air is channelled by the enclosure wall around the outer edge of the mounting plate 14 until it reaches the main filter portion 51 which stands clear of the mounting plate 14.

One final feature of the filter assembly 50 is the breather filter arrangement illustrated in FIG. 4. A covered radially extending slot 80 in filter assembly 50 is located over a bleed hole 81 through a portion of the motor mounting plate 14. The bleed hole 81 is surrounded by a foam seal 82 so that air entering the hole must pass through the filter paper 53 to reach slot 80. The space outside the seal below the filter paper is connected through a passage 84 to the gap 55 communicating with the hub assembly interior. Thus, the interior of the hub assembly is effectively maintained at or near to ambient pressure by the action of the breather filter. This has the advantage, in operation, that air is not drawn in through the bearings 16. It will be realised that, although the above discussion and the arrows shown in FIG. 4 imply an inward flow of air, the breather system is also effective to equalise pressures if the interior pressure should be higher than ambient for any reason.

Figure 6:
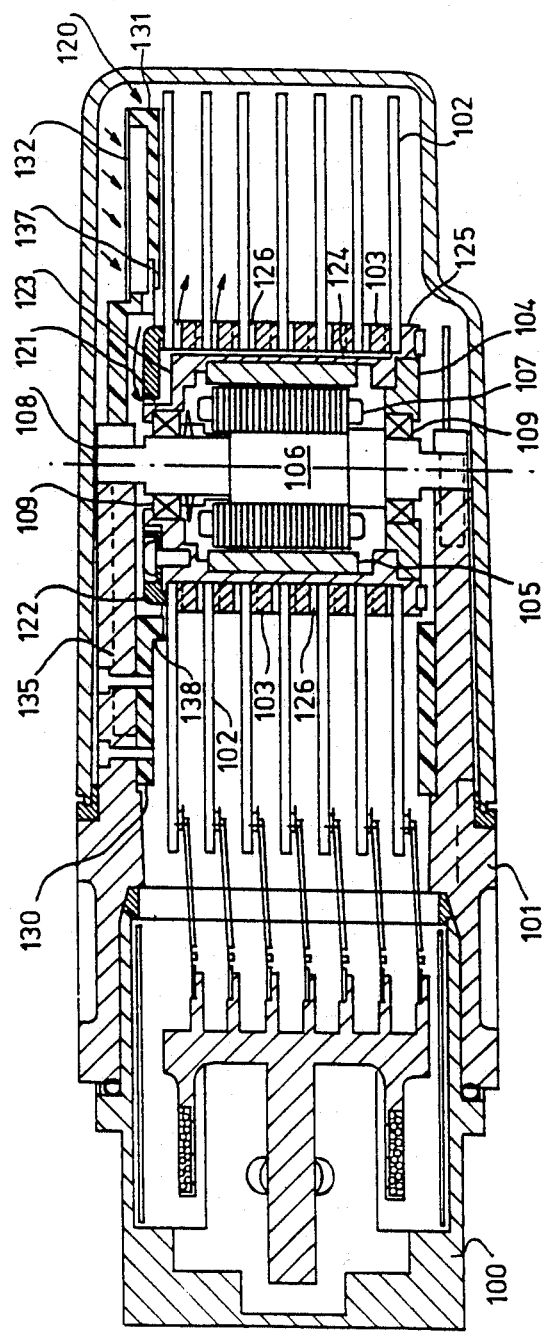
FIG. 6 is a cross section through an alternative construction of disk file according to the present invention.

Turning now to FIGS. 6 and 7, an alternative construction of disk file is shown which employs a similar filtration principle. The file is of the type described in commonly assigned U.S. patent application Ser. No. 918,184 entitled "Disk File with In-Hub Motor." This file comprises a disk stack and two head positioning actuators 100 mounted on opposite sides of a central box frame 101. The disk stack consists of alternate disks 102 and slotted spacers 103 mounted for rotation on a hub assembly 104 which includes the rotor 105 of an in-hub electric motor 106. The stator 107 of the motor is mounted on a central non-rotating spindle 108. The hub assembly 104 is supported for rotation about the spindle by two bearings 109. Further details of the general construction of this file can be found in the above referenced application.

Circulation of air within the enclosure takes place as a result of the pumping action of the rotating disk stack. From the high pressure region at the periphery of the disks 102, air returns through a part annular filter assembly 120 to a lower pressure region above the disk stack, as shown by the arrows. Apertures 121 in the disk clamp 122 enable communication with cross grooves 123 and flutes 124 in the outer casing 125 of the rotor 105. These in turn lead to slots 126 in castellated spacers 103 to complete the return path to the inter disk space.

The filter assembly 120 which is also shown in plan view in FIG. 7, consists of two mouldings 130 and 131 and a filter paper 132. One moulding 130 is largely a mounting plate for the moulding 131. Moulding 130 is bolted to a protruding flange of the box frame 101 (broken away in FIG. 7) through bores 133. Two wing portions 134 of plate 130 provide a support surface for corresponding lip portions 135 extending from the part-annular moulding 131.

The part annulus 131 is again in the form of a compartmentalised shallow trough divided by ribs 136. The filter paper 132 is stuck over the ribs and to the rim of the trough so that the primary return airflow path to the hub is through the filter paper. Apertures 137 in each compartment connect the trough to the space above the hub assembly.

Leakage of air past the filter assembly 120 is reduced by minimising the separation between the lower planar surface of moulding 131 of the filter assembly 120 and the upper surface of the top disk 102. At a separation of 0.6 mm leakage is reduced and an increased rate of airflow through the filter is achieved.

An increased clearance is provided between mounting plate 130 and the top disk 102 in order to allow space for access by the heads of the alternate actuator (not visible in FIG. 6) which serve the top surfaces of the disks. A barrier to the resulting parallel leakage path around the filter is provided by a downwardly turned rim 138 on the portion 130,

We claim:

1. A disk file comprising a disk enclosure;
   a disk stack within the enclosure comprising a plurality of annular information storage disks, adjacent disks of which are separated by a radially vented spacer;
   a plurality of transducer heads co-operable with the disks for writing information on and/or reading information from the disks;
   a rotatable hub assembly for supporting the disk stack for rotation therewith, the hub assembly including vents by way of which and of said vented spacer an axial region of the enclosure adjacent an extreme disk of the stack communicates with the space between adjacent disks whereby, in operation, the rotation of the disks creates a high pressure region at the periphery of the disk stack and a low pressure region adjacent the hub assembly to cause a circulatory air flow around and between the disks via said hub assembly vents and the vented spacer;
   and a filter assembly fixedly mounted in said axial region and extending circumferentially around the hub assembly with the filter media facing in the axial direction opposite said disk stack, the arrangement of the filter assembly being such that communication between said axial region of the enclosure and said hub assembly vents is substantially via the filter assembly except for a clearance gap between the filter assembly and the combination of the hub assembly and the extreme disk to permit the latter to rotate freely, wherein the filter assembly has a major planar surface closest to the surface of the extreme disk and at a uniform separation therefrom, the separation between the planar surface of the filter assembly and the extreme disk surface being smaller than the separation between the disks by an amount sufficient at least to reduce inward leakage of air through the clearance gap and to increase air flow through the filter assembly.

2. A disk file as claimed in claim 1, in which the separation between the filter assembly and the extreme disk is sufficiently small that the filter assembly and extreme disk form a centrifugal viscous pump opposing the pressure differential between said high and low pressure regions.

3. A disk file as claimed in claim 1, in which the enclosure comprises a base casting, the filter assembly being mounted on the base casting.

4. A disk file as claimed in claim 1 in which the hub assembly includes an internal drive motor with an external cylindrical rotor casing, the motor casing having a flange on which the disk stack is supported, the hub assembly vents including cross grooves and flutes in the outer surface of the rotor casing which communicate with the radial slots in the spacers of the disk stack.

5. A disk file as claimed in claim 1, in which the separation between the filter assembly and the extreme disk is less than 1.1 mm.

6. A disk file as claimed in claim 5, in which the separation lies in the range 0.35 to 0.6 mm.

7. A disk file as claimed in claim 1, further comprising a drive motor having a mounting plate in which a spindle is supported for rotation, the hub assembly being mounted on one end of the spindle and the filter assembly being mounted on the motor mounting plate adjacent the extreme disk of the stack.

8. A disk file as claimed in claim 7 in which the hub assembly includes a bell portion mounted on the spindle and having an outer flange on which the disk stack is supported, spaced from the motor mounting plate, the hub assembly vents being slots in the spacers of the disk stack.

9. A disk file as claimed in claim 1, in which the filter assembly comprises an arcuate portion extending around a major portion only of the hub assembly circumference at said uniform separation from the extreme disk, the ends of the arcuate portion defining a gap around a minor portion of the hub assembly circumference sufficiently deep relative to said uniform separation to accommodate at least one of the transducing heads for co-operation with the outer surface of the extreme disk.

10. A disk file as claimed in claim 9, in which the arcuate portion of the filter assembly is an annular shallow trough and includes a laminar filter medium of corresponding shape covering the trough, the trough being apertured at its inner diameter to communicate with the low pressure region adjacent the hub assembly.

11. A disk file as claimed in claim 9, including a barrier extending circumferentially across the gap inward of the transducing head position to reduce leakage of air via the gap to the hub assembly.

12. A disk file as claimed in claim 11, in which the barrier is formed as a lip on the filter assembly which extends towards the extreme disk.

* * * * *